Figure 1:
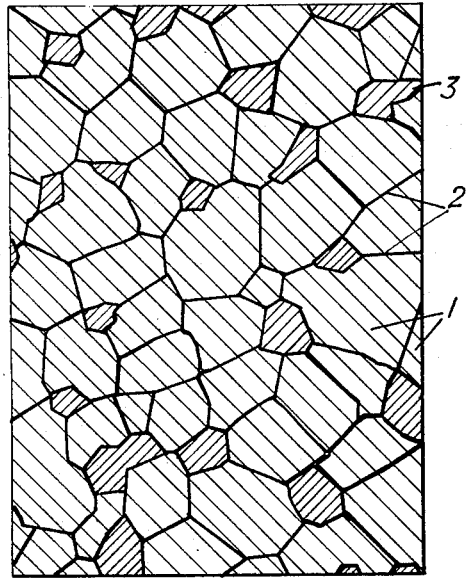

Sept. 8, 1959

C. L. GUILLAUD 2,903,429

MODIFIED FERRITES

Filed July 8, 1955

3 Sheets-Sheet 1

Inventor
C. L. GUILLAUD
By
Attorney

Sept. 8, 1959   C. L. GUILLAUD   2,903,429
MODIFIED FERRITES
Filed July 8, 1955   3 Sheets-Sheet 3
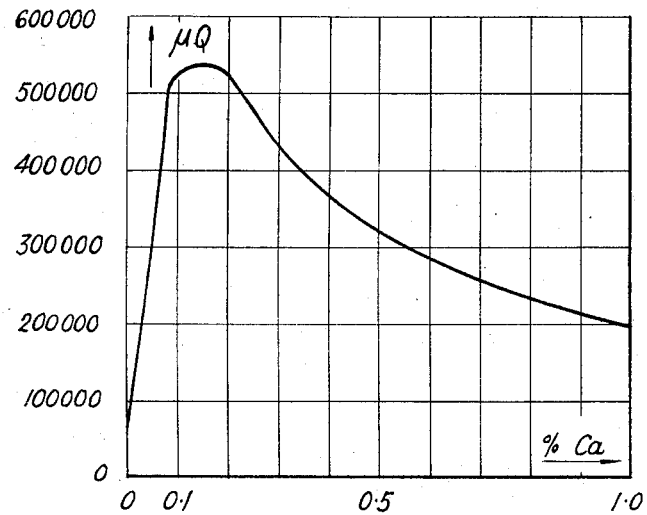
FIG. 4.
FIG. 5.
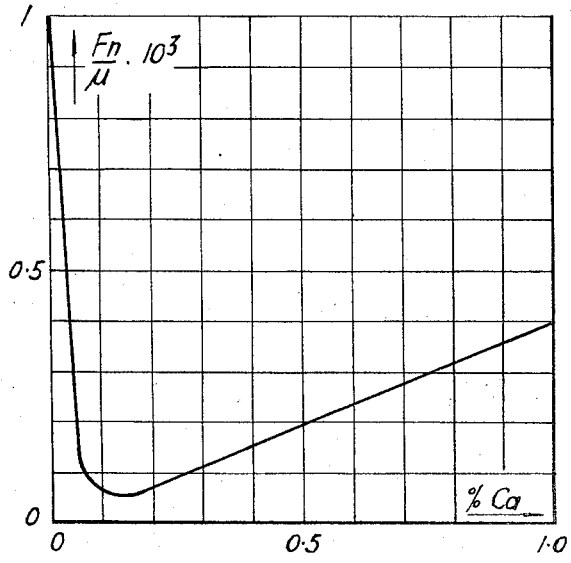
Inventor
C L GUILLAUD
By RP Morris
Attorney

2,903,429
MODIFIED FERRITES

Charles Louis Guillaud, Bellevue, France, assignor to Centre National de la Recherche Scientifique, Paris, France, a French Government administration Application July 8, 1955, Serial No. 520,877

Claims priority, application France July 13, 1954

4 Claims. (Cl. 252—62.5)

The present application relates to magnetic materials of the kind known as ferrites, that contain manganese and that have a coercive force less than 0.5 oersted.

The qualities of magnetic materials for telecommunication purposes such as for use as cores of inductance coils are characterised by their initial magnetic permeability $\mu$, their eddy current loss coefficient $F_n$, their hysteresis loss coefficient H, and their residual loss coefficient $t$.

These different coefficients may be measured by means of a test inductance coil of L henrys wound on a core made of the particular material stated, the effective resistance of which at the angular frequency $\omega = 2\pi f$ radians per second is measured as well as the part $R_p$ of this resistance due to the losses in the said core. The factor of quality of the core is denoted by $$Q = \frac{L\omega}{R_p}$$

It should be understood that the initial permeability $\mu$ is to be measured in a magnetizing field less than 1 millioersted for the frequency of 800 hertz and at a temperature of 20° C. The formula used for defining the different loss coefficient is $$\frac{R_p}{L} = F_n \cdot \frac{f^2}{800^2} + H \cdot \frac{NI}{l} \cdot \frac{f}{800} + t \cdot \frac{f}{800}$$

in which $R_p$ is a loss resistance in the ferrite core of a coil expressed in ohms, L is the inductance of this coil in henrys, $f$ is the frequency in hertz, N is the number of turns of the winding, I is the effective value of the current in the winding in amperes, $l$ is the mean length of line of force in centimetres, $F_n$ is the eddy current loss coefficient, H is the hysteresis loss coefficient, and $t$ is the residual loss coefficient.

The eddy current loss coefficient $F_n$ is expressed in ohms per henry and related to the frequency of 800 hertz, but effectively measured between 40 and 200 hertz in a field so low that the hysteresis losses are negligible (for example, 1 millioersted), and at temperature of 20° C. for cores having a cross section of 0.5 by 0.6 centimetre, and thus a cross sectional area of 0.3 square centimetre.

The hysteresis loss coefficient N expressed in ohms per henry for a field $$\frac{NI}{l} = \text{one ampere}$$

turn per centimetre referred to a frequency of 800 hertz should be measured in fields of from 2 to 30 millioersteds, a 100 kilohertz and at 20° C.

The residual loss coefficient $t$ expressed in ohms per henry referred to a frequency of 800 hertz is reduced from the ordinate at the origin of the curves $$\frac{R_p}{fL} = g(f)$$

for a very small field at a temperature of 20° C.

In endeavouring to obtain inductance coils having a quality factor as high as possible and a volume as small as possible, the desirable properties for the material constituting a core, can be characterised in this respect by the product $P = \mu Q$.

Ferrites are prepared by intimately mixing the constituent oxides, pressing into core form and heat treating to form the ferrite.

It is the object of the present invention to obtain ferrites with very small eddy current and hysteresis losses, without appreciable reduction of initial permeability.

If the polished and etched section of a ferrite be examined under a microscope it exhibits a granular structure and the inventor has discovered that the properties of ferrites can be explained only by considering them as a granular structure composed of a crystalline magnetic phase, and a more or less well defined second phase forming the boundaries of the grains of the first phase.

The importance of this second phase, the grain boundaries in determining the properties of a magnetic ferrite has not hitherto received much attention.

According to the present invention a method of manufacture of a ferrite containing manganese is characterised by the step of adding to the basic constituents intended to form the ferrite of an amount of calcium between 0.01% and 1% by weight. These constituents with the added calcium are then pressed and heat treated in the usual manner.

The amount of calcium introduced is preferably between 0.05% and 0.25% by weight.

By this means the eddy currents of the ferrite are found to be considerably reduced, as well as the hysteresis losses though the latter are reduced to a lesser degree, whilst the residual losses are not increased and the decrease in initial permeability, when it occurs, is not great. Thanks to this very important improvement in losses, the product Q in ferrites according to the invention can be as much as six times that of this product of ferrites without calcium.

These improvements appear to be due to the formation of grain boundaries containing calcium oxide. This action of calcium appears to be due principally to the formation in the grain boundaries of a solid solution having as its basic constituent a manganese calcium compound of high electrical resistance.

It would also appear that, of all elements that may be added to a ferrite, only calcium leads to a very important improvement in the product Q. Thus for example, other oxides such as silica, alumina or titania cannot replace calcium for obtaining these remarkable results.

At the same time amounts of calcium greater than 1% lead to a notable decrease in initial permeability and to an increase in losses and should not be used.

Calcium can be added to the original mixture, either in the form of calcium oxide or in a form which decomposes to the oxide during the heat treatment. Preferably the initial mixture from which the ferrite is to be formed is reduced by milling to particles of the order of 0.5 micron in diameter. Preferably also, the calcium is first incorporated in the oxide of manganese before the latter is milled with the other oxides. This incorporation may be done by milling but a preferred and convenient way of thus incorporating the calcium with the oxide of manganese is to co-precipitate manganese and calcium as carbonates or oxalates, which are decomposed to oxides during the heat treatment. Equally however all the oxides together with calcium oxide may be first precipitated together for example as carbonates or oxalates which are decomposed to oxides.

As the mixture of oxides is usually milled with an aqueous medium, in which calcium compounds are partly soluble, account must be taken of the calcium which may be removed from the mixture by solution in this medium. A harmless reagent such as ammonium oxalate may, however, be added to the aqueous medium in order to precipitate or prevent solution of the calcium.

Figure 2:
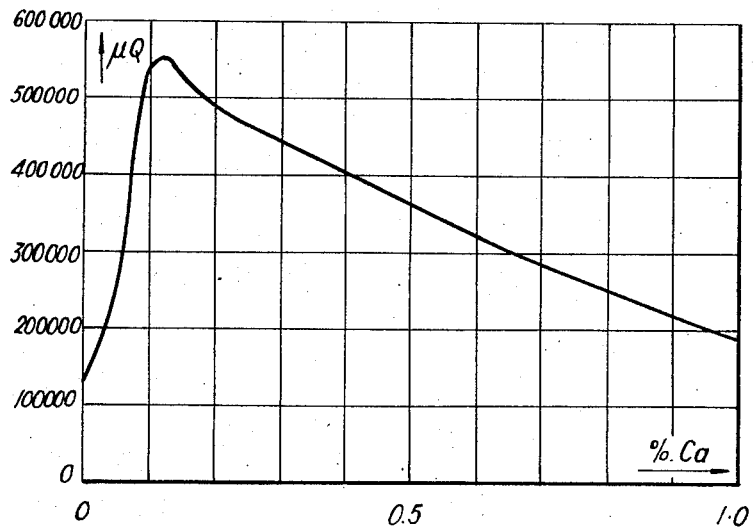
Figure 3:
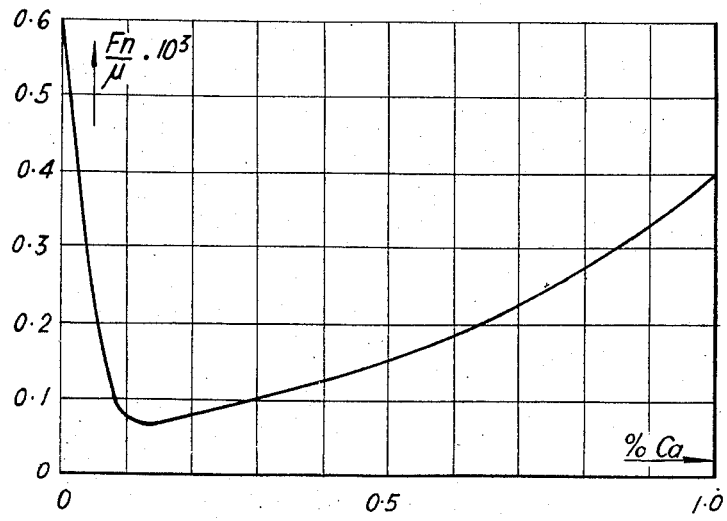

The results obtained according to the present invention will be better understood by the following description taken in conjunction with the accompanying drawings, in which Fig. 1 shows a highly magnified, polished and etched section of a ferrite made according to the present invention. Figs. 2 and 3 are curves representing the magnetic properties of certain ferrites as a function of the percentage of calcium by weight introduced in the initial mixture from which they are manufactured. Figs. 4 and 5 are similar curves relating to a ferrite of another composition.

Referring to the drawings and first to Fig. 1, this figure shows the appearance of a magnified section of a ferrite prepared by etching and polishing by the methods usually employed. A ferrite represents a granular structure but in a ferrite according to the present invention the boundaries 2 between the grains 1 are acentuated in comparison with normal ferrites. In this figure there appear certain cavities 3 which will be referred to hereinafter.

When calcium is added to a mixture of oxides containing manganese and adapted to form a ferrite a part of the calcium penetrates into the grain boundaries as the ferrite is formed thus increasing the electrical resistance of these boundaries which explains, at least in part, the great decrease observed in eddy current losses.

It is however, advisable that any such addition to the ferrite should not only reduce the eddy current losses but should cause little or no reduction in the initial permeability and should not lead to any increase in the hysteresis and residual losses.

For these purposes several factors must be taken into consideration, such as the amount of calcium added and the grain size in the ferrite.

The following Table I shows the effect of different amounts of calcium. All ferrites to which Table I relates have been given in their formation identical heat treatment, and only differ as to their composition in the amounts of calcium introduced as shown in column 1 of the table. These materials were prepared in accordance with application No. 369,823, filed July 23, 1953, the original mixture being a mixture of ferric oxide, manganese and zinc oxide in molecular proportions of 53%, 28% and 19% respectively, the manganese oxide being reckoned as MnO, though originally present in the form of $Mn_3O_4$. The percentage of impurities in these oxides remaining in the final product was less than 0.05% by weight.

TABLE I

| Percentage weight of calcium in original mixture | Initial permeability | $\frac{F_n}{\mu} \cdot 10^3$ | $\frac{H}{\mu^2} \cdot 10^6$ | $\mu Q \times 10^{-3}$ |
| --- | --- | --- | --- | --- |
| zero | 3,000 | 0.60 | 450 | 140 |
| 0.01 | 2,700 | 0.51 | 450 | 160 |
| 0.02 | 2,600 | 0.42 | 450 | 185 |
| 0.04 | 2,600 | 0.29 | 400 | 245 |
| 0.06 | 2,700 | 0.17 | 300 | 345 |
| 0.08 | 2,600 | 0.10 | 250 | 465 |
| 0.10 | 2,500 | 0.07 | 250 | 525 |
| 0.15 | 2,500 | 0.07 | 250 | 525 |
| 0.20 | 2,400 | 0.09 | 260 | 485 |
| 0.5 | 2,000 | 0.15 | 350 | 372 |
| 0.75 | 1,500 | 0.25 | 400 | 271 |
| 1.00 | 1,200 | 0.40 | 450 | 193 |

Figure 2 translates these results into the form of a graph showing the variation of the term $\mu Q$ with calcium content and Fig. 3 is a graph of the term $$\frac{F_n}{\mu} \cdot 10^3$$

with calcium content.

It will be noted that even very small amounts of calcium produce significant improvements: that the greatest improvement is obtained with addition of between 0.1 and 0.2 percent of calcium and that even with the addition of 1% of calcium the overall results are better than those obtained without calcium.

The amount of calcium required for best results does not vary significantly with the manganese content of the ferrite.

Table II below gives some results for a ferrite formed from a mixture of oxides containing 54.5 mol percent $Fe_2O_3$, 37.5 mol percent of manganese oxide reckoned as MnO and 8 mol percent of ZnO.

| 1% Percentage in weight of Calcium in initial mixture | Initial permeability | $\frac{F_n}{\mu} \cdot 10^3$ | $\mu Q \times 10^{-3}$ |
| --- | --- | --- | --- |
| zero | 2,600 | 0.98 | 91 |
| 0.05 | 2,600 | 0.20 | 314 |
| 0.10 | 2,500 | 0.07 | 529 |
| 0.20 | 2,400 | 0.07 | 528 |
| 0.5 | 1,800 | 0.20 | 314 |
| 1.00 | 1,000 | 0.40 | 193 |

Figs. 4 and 5 give the variations in the last two columns of Table II with variation in calcium content in the form of curves, the shape of which is very similar to that of Figs. 2 and 3.

The values of Q entering into these results were determined at 40,000 cycles per second for a very weak magnetic field.

Two other factors condition the properties of ferrites: these are, on the one hand, the dimensions of the grains, and on the other the uniformity of their dimensions in the volume of the material.

For all ferrites, the inventor has found that the initial permeability increases rapidly with the diameter of the grains. Thus, for example, for a ferrite containing 28 mol percent of MnO and 53.4 mol percent of $Fe_2O_3$ and the remainder ZnO the initial permeability is of the order of 4,000 if the mean size of the grains is of the order of 20 microns. For a ferrite of the same composition the initial permeability is no more than 1,000 if the mean dimension of the grains is about 4 microns. Above a dimension of about 15 microns the initial permeability increases only slowly.

The inventor has also found that it is desirable that the grains should have throughout the structure dimensions as uniform as possible, the inclusion of small grains between large grains increases the hysteresis losses.

The granular structure of a ferrite has thus great importance in determining its properties and as the relative volume of the grain boundaries is greater as the grain size is smaller it is necessary, in general, to add more calcium as the grains have more reduced dimensions.

The inventor has found that the grain size to be sought for, compatible with the optimum quantity of calcium, should be between 5 and 20 microns, but with the addition of calcium according to the invention, the factor $F_n/\mu$ is practically independent of grain dimensions.

It is therefore advantageous to adapt the time and temperature of heat treatment in order to obtain the required grain size. As, however, the heat treatment required depends on the nature and proportions of the constituent oxides of the ferrite the particular heat treatment must be determined experimentally in each case. In one particular case, for example, a heat treatment of 1265° C. for four hours gives a mean grain diameter of 20 microns with an initial permeability of 3,800. A heat treatment of the same ferrite mixture of 1200° C. for 2 hours gives a mean grain diameter of 4 microns and an initial permeability of 1000. From these figures a very few trials are necessary in order to determine the optimum heat treatment for a given result.

Another factor is the cavities 3 in Fig. 1. As will be noted these cavities occur in the grain boundaries. The cavities appearing in Fig. 1 are to some extent due to the removal of material during the steps of etching and polishing but to some extent also they represent true cavities which are formed during the heat treatment. It is important for best results that these cavities should be formed in the grain boundaries 2 and not in the interior of the grains 1. It is found that if the grain size is not allowed to exceed a maximum of 20 microns diameter there is very little danger of cavities being formed in the grains themselves.

Four further examples of the invention will now be given.

Example I

The starting mixture in this case consisted of 52.6 mol percent of $Fe_2O_3$: 28.6 mol percent of MnO (in the form of $Mn_3O_4$) and 18.8 mol percent of ZnO. The oxides were in very pure form except for the $Mn_3O_4$ which contained 0.5% by weight of calcium. The calcium was introduced by coprecipitating the manganese and calcium in the form of carbonates which were then calcined at 950° C. in air for 2 hours. The mixed calcium and manganese oxides were milled together for 24 hours with the remaining oxides, using steel balls, the $Fe_2O_3$ content being thus increased by 0.6%.

The mixture was pressed into ring form and subjected to a heat treatment for four hours in an atmosphere of nitrogen containing a small percentage of oxygen. The temperature and time of heating are regulated to obtain the desired granular structure and the quantity of oxygen in the nitrogen gas is determined experimentally in order to obtain a content by weight of approximately 2.4% of FeO in the finished ferrite. This heat treatment is according to our application No. 369,823, filed July 23, 1953. This ferrite has the following properties:

$$\mu = 3,200$$
$$\frac{F_n}{\mu} \cdot 10^3 = 0.11$$
$$\frac{H}{\mu^2} \cdot 10^6 = 250$$
$$\frac{t}{\mu} \cdot 10^3 = 4$$

The mean grain diameter was 10 microns.

Example II

A ferrite was prepared similarly to that in Example I but having the following molecular proportions after milling, $Fe_2O_3 = 54.3\%$ $Mn_3O_4$ (reckoned as MnO) 31%, ZnO 14.7%. The manganese oxide contained 0.7% by weight of calcium added by coprecipitation of manganese and calcium oxalates. The best treatment was adjusted to give a final FeO content by weight of 3.4%. This ferrite because of the FeO content had a temperature coefficient of permeability substantially zero between 0° C. and 60° C. and had other properties as follows:

$$\mu = 2,500$$
$$\frac{F_n}{\mu} \cdot 10^3 = 0.08$$
$$\frac{H}{\mu^2} \cdot 10^6 = 400$$
$$\frac{t}{\mu} \cdot 10^3 = 4$$

and a curie point of 208° C.

Example III

A mixture of oxides was prepared in molecular percentages (after milling), ferric oxide 34.9%, manganese oxide (reckoned as MnO) 38% and zinc oxide 7.7%. Calcium carbonate was added to the mixed oxides, before milling in such proportion that the calcium was 0.2% by weight of the oxides. The method of preparation of a ferrite was similar to that of Example I, the heat treatment being adjusted to give a percentage by weight of FeO of 3.7%. This ferrite had the following properties:

$$\mu = 2,000$$
$$\frac{F_n}{\mu} \cdot 10^3 = 0.05$$
$$\frac{H}{\mu^2} \cdot 10^6 = 500$$
$$\frac{t}{\mu} \cdot 10^3 = 5$$

$B_{max}$ (at normal temperature) = 5,400 gauss

Example IV

A manganese ferrite was prepared from $Fe_2O_3$ 56.8 mol percent and $Mn_3O_4$ (reckoned as MnO)—43.2 mol percent (after milling), 0.25 by weight of calcium being added in the mill in the form of carbonate.

The pressing and heat treatment were similar to those of the preceding examples, the content by weight of FeO in the final ferrite being 5.20%. The properties of this ferrite were $$\mu = 1,100$$
$$\frac{F_n}{\mu} \cdot 10^3 = 0.05$$
$$\frac{H}{\mu^2} \cdot 10^6 = 800$$
$$\frac{t}{\mu} \cdot 10^3 = 10$$

What I claim is:

1. A method of manufacturing a ferromagnetic material comprising mixing in molecular proportions 50 to 55.6% $Fe_2O_3$, 24 to 39% MnO, 5.4 to 26% ZnO, adding to said mixture .01 to 1% by weight of calcium, and heat treating said mixture at a temperature between 1170° and 1250° C. for a period of from 2 to 4 hours in an inert atmosphere containing a small percentage of oxygen, to form a ferrite.

2. The method according to claim 1, wherein said weight of calcium added to said mixture is .05 to .25% by weight.

3. A ferrite of the manganese-zinc type of high permeability and low losses, having a coercive force less than 0.5 oersted and comprising in molecular proportions 49.7 to 50.6% $Fe_2O_3$, 24 to 39% MnO, .3 to 7.5% FeO, 3.9 to 26% ZnO, and a proportion by weight of calcium between .01 and 1% located substantially in the grain boundaries, and the grain dimensions being between 5 and 20 microns.

4. The material according to claim 3, wherein said calcium is in the proportion of .05 to .25 by weight.

References Cited in the file of this patent

UNITED STATES PATENTS

| | | |
|---|---|---|
| 2,715,109 | Albers-Schoenberg | Aug. 9, 1955 |

FOREIGN PATENTS

| | | |
|---|---|---|
| 688,769 | Great Britain | Mar. 11, 1953 |
| 697,219 | Great Britain | Sept. 16, 1953 |
| 1,110,334 | France | Oct. 12, 1955 |